(12) United States Patent
Lautenschläger et al.

(10) Patent No.: US 11,465,929 B2
(45) Date of Patent: Oct. 11, 2022

(54) FLAT GLASS, METHOD FOR PRODUCING SAME, AND USE THEREOF

(71) Applicant: SCHOTT AG, Mainz (DE)

(72) Inventors: Gerhard Lautenschläger, Jena (DE); Andreas Krieg, Jena (DE); Andreas Voitsch, Jena (DE); Axel Engel, Ingelheim (DE); Christian Pitzel, Jena (DE); Matthias Schmidt, Jena (DE); Thomas Kloss, Jena/Cospeda (DE)

(73) Assignee: SCHOTT AG, Mainz (DE)

(*) Notice: Subject to any disclaimer, the term of this patent is extended or adjusted under 35 U.S.C. 154(b) by 0 days.

(21) Appl. No.: 16/414,982

(22) Filed: May 17, 2019

(65) Prior Publication Data
US 2019/0352217 A1    Nov. 21, 2019

(30) Foreign Application Priority Data
May 18, 2018 (DE) .................. 10 2018 112 070.2

(51) Int. Cl.
*C03C 3/091* (2006.01)
*F21V 8/00* (2006.01)

(52) U.S. Cl.
CPC ............ *C03C 3/091* (2013.01); *G02B 6/0065* (2013.01)

(58) Field of Classification Search
CPC .............................. C03C 3/091; G02B 6/0065
See application file for complete search history.

(56) References Cited

U.S. PATENT DOCUMENTS

| | | | |
|---|---|---|---|
| 3,994,708 | A | 11/1976 | von Reth |
| 4,298,389 | A | 11/1981 | Johnson |
| 4,792,535 | A | 12/1988 | Fine |
| 4,925,814 | A | 5/1990 | Fine |
| 5,045,509 | A | 9/1991 | Kiefer |
| 5,219,801 | A | 6/1993 | Shorrock |
| 5,547,904 | A | 8/1996 | Watzke |
| 5,610,108 | A | 3/1997 | Watzke |
| 5,656,558 | A | 8/1997 | Brix |

(Continued)

FOREIGN PATENT DOCUMENTS

| | | |
|---|---|---|
| CN | 105209966 | 12/2015 |
| DE | 2519505 | 11/1975 |

(Continued)

OTHER PUBLICATIONS

ISO 7991, "Glass-Determination of coefficient of mean linear thermal expansion", 1987, 4 pages (two-sided).

(Continued)

*Primary Examiner* — Karl E Group
*Assistant Examiner* — Cameron K Miller
(74) *Attorney, Agent, or Firm* — Ruggiero McAllister & McMahon LLC

(57) ABSTRACT

A flat glass is provided that exhibits high transmittance to electromagnetic radiation in a range of wavelengths from 200 nm to 1500 nm. The transmittance for the flat glass having a thickness of 1 mm is 20% or more at a wavelength of 254 nm, 82% or more at a wavelength of 300 nm, 90% or more at a wavelength of 350 nm, 92% or more at a wavelength of 546 nm, 92.5% or more at a wavelength of 1400 nm, 91.5% or more in a wavelength range from 380 nm to 780 nm, and 92.5% or more in a wavelength range from 780 nm to 1500 nm.

19 Claims, 2 Drawing Sheets

(56) References Cited

U.S. PATENT DOCUMENTS

| | | |
|---|---|---|
| 9,145,333 B1 | 9/2015 | Dejneka |
| 2005/0000248 A1 | 1/2005 | Lautenschlager |
| 2014/0061186 A1 | 3/2014 | Laurent |
| 2014/0117294 A1 | 5/2014 | Kass |
| 2014/0152914 A1* | 6/2014 | King .................... G02B 6/0035 349/12 |
| 2016/0176751 A1 | 6/2016 | Lautenschlager |
| 2017/0052311 A1* | 2/2017 | Lautenschlager .... G02B 6/0055 |
| 2017/0247284 A1 | 8/2017 | Miyasaka |
| 2017/0247285 A1 | 8/2017 | Ellison |
| 2018/0057393 A1 | 3/2018 | Sakagami |
| 2018/0208500 A1 | 7/2018 | Lee |

FOREIGN PATENT DOCUMENTS

| | | |
|---|---|---|
| DE | 3826586 | 3/1989 |
| DE | 3801840 | 8/1989 |
| DE | 4325656 | 2/1995 |
| DE | 4335204 | 4/1995 |
| DE | 4338128 | 5/1995 |
| DE | 69214985 | 6/1997 |
| DE | 10150884 | 5/2003 |
| DE | 102009021115 | 11/2010 |
| DE | 102012219614 | 12/2013 |
| DE | 102014119594 | 6/2016 |
| DE | 102015113558 | 2/2017 |
| EP | 1446362 | 3/2005 |
| EP | 2261183 | 12/2010 |
| JP | 2010208906 | 9/2010 |
| JP | 5540506 | 7/2014 |
| JP | 2015193521 | 11/2015 |
| WO | 2012146860 | 11/2012 |
| WO | 2016115685 | 7/2016 |
| WO | 2017052338 | 3/2017 |
| WO | 2017070066 | 4/2017 |
| WO | 2017070500 | 4/2017 |
| WO | 2017119399 | 7/2017 |
| WO | 2016194780 | 3/2018 |

OTHER PUBLICATIONS

ISO 7884-8, Glass-Viscosity and viscometric fixed points—Part 8: Determination of (dilatometric) transformation temperature:, Feb. 1998, 7 pages.

DIN 52324 (Superceded by ISO 7884-8), 13 pages.

DIN ISO 719 class HGB 1, "Glass-Hydrolytic resistance of glass grains at 98 degrees C-Method of test and classification". Second Edition, Oct. 1, 1985, 8 pages.

DIN 12116 class S 1 W, "Testing the resistance of glass to attack by boiling hrdrochloric acid solution, and classification", Mar. 2001, 5 pages.

DIN ISO 695 class A3, "Glass—Resistance to attack by a boiling aqueous solution of mixed alkali—Method of Test and classification", Third Edition, May 15, 1991, 8 pages.

* cited by examiner

FLAT GLASS, METHOD FOR PRODUCING SAME, AND USE THEREOF

CROSS REFERENCE TO RELATED APPLICATIONS

This application claims benefit under 35 USC § 119 of German Application No. 10 2018 112 070.2 filed May 18, 2018, the entire contents of which are incorporated herein by reference.

BACKGROUND

1. Field of the Invention

The invention relates to a flat glass, preferably a flat glass with high transmittance for electromagnetic radiation in the wavelength range from 200 nm to 1500 nm.

2. Description of Related Art

The material class of glasses has long been known.

Flat glass also has been state of the art for many years. Flat glass generally refers to a flat, in particular sheet-like or ribbon-shaped glass. Known manufacturing methods for flat glass include float, rolling, and drawing processes, for example.

Especially borosilicate glasses are of particular importance in the class of glasses. They are employed in a large variety of applications because of their special properties such as low susceptibility to temperature changes, high chemical resistance to a wide range of reagents and their good dimensional stability even at high temperatures. This glass system in particular allows to achieve specific properties, such as particularly high transmittance of the material in a specific range of wavelengths, for example in the NIR wavelength range from about 850 nm to about 1500 nm. So, because of the various options of adjusting the properties of the glass, a variety of applications and compositions of borosilicate glasses are known.

International patent application WO 2012/146860 A1 relates to the use of a borosilicate glass for induction applications and discloses both the use of an alkali borosilicate glass and the use of an alkali-free borosilicate glass. The use of borosilicate glass in particular appears advantageous because the material with low coefficients of thermal expansion, in particular expansion coefficients of $5.0*10^{-6}$/K, can be toughened thermally so that glass panels of sufficient hardness and strength for being used as a cooking surface are obtained.

Furthermore, German patent application DE 4325656 A1 discloses fire-resistant glazing of fire protection class G, in which alkali borosilicate glasses are highly toughened thermally. The Coefficient of Thermal Expansion (CTE) of such glasses is $4*10^{-6}$/K, for example. All the glasses have a rather high content of alkaline earth oxides and of ZnO and $ZrO_2$, ranging between 6 wt % and 10 wt %.

German patent application publication DE 101 50 884 A1 discloses an alkali borosilicate glass which is well suited for being toughened thermally. It has a coefficient of thermal expansion of $4*10^{-6}$/K, for example, and furthermore comprises the alkaline earth oxide CaO.

US 2017/0247284 A1 discloses borosilicate glasses for infrared applications such as cover plates for heaters. The examples given there for the embodiments of glasses 1 to 10 are alkali-free alkaline earth borosilicate glasses. Comparative examples 11 to 13 of US 2017/0247284 A1 include the Neoceram glass ceramic, a "Pyrex" type borosilicate glass, and an alkali-free borosilicate glass for TFT applications.

U.S. Pat. No. 9,145,333 B1 discloses compositions for alkali borosilicate glasses which are optimized for chemical toughening, that is to say for example with regard to the diffusion coefficient, compressive stress at the glass surface, etc.

Alkali borosilicate glasses also find application as a carrier substrate, for example for so-called biochips or microarrays. For example, European patent EP 1 446 362 B1 describes such a glass. This glass exhibits low intrinsic fluorescence and good UV transparency. With regard to the content of color-imparting ions, there are only limits given for the $Fe_2O_3$ content (of less than 150 ppm), for octahedrally bound $Fe^{3+}$ of less than 10 ppm, and for $Cr^{3+}$ of less than 10 ppm and preferably even less than 2 ppm. Other color-imparting elements are not limited here, in particular the transition metals of the 3rd period (i.e. of atomic numbers 21 through 30, here in particular the metals from titanium to copper). However, this does not allow to achieve glasses of high light transmittance in the entire range of wavelengths from 200 nm to 1500 nm.

In the context of the present invention, the transition metals of the 3rd period of the periodic table are also referred to as "3d elements" or "3d metals", for short. Transition metals are understood to mean the metals of atomic numbers 21 to 30, 39 to 48, 57 to 80, and 89, and 104 to 112 in the context of the present invention.

German patent application publication DE 10 2014 119 594 A1 relates to a borosilicate glass exhibiting low brittleness and high intrinsic strength and to the production and use thereof. Optical properties such as light transmittance, refractive index, fluorescence, and solarization, or the like are neither described nor claimed. Accordingly, the content of so-called 3d elements in the glasses is not described either.

U.S. patent application US 2017/0052311 A1 discloses a glass for a light guide plate, which is an alkali borosilicate glass that is highly transparent for light in the wavelength range from 400 nm to 800 nm and free of selective unwanted light absorption. Light transmittance reducing ions of the 3d elements, such as Fe, Cr, Ni, Co, Cu, Mn, Ti, and V are said to amount to a total content of not more than 50 ppm. However, a quantification of the individual elements is not made and in particular it is not taken into account that different ions have a differently strong color-imparting effect and may interact with one another. So, the glasses which are within the composition range of the glass compositions of US 2017/0052311 A1 do not allow to create a glass that is highly transparent in the entire wavelength range from 200 nm to 1500 nm. The content of divalent iron $Fe^{2+}$ is intended to be the lowest possible compared to the total iron content in the glasses of US 2017/0052311 A1.

U.S. patent application US 2017/0247285 A1 discloses light guide plates made of glass, wherein the glass is a high-alkali alkaline earth borosilicate glass. The glass exhibits high light transmittance in the wavelength range from 380 nm to 700 nm. For being chemically toughened, the $Na_2O$ contents are greater than 4 mol %. $B_2O_3$ contents are less than 10 mol % in each case. Although the contents of some 3d elements such as Co, Ni, and Cr are limited, other 3d elements are not considered at all, for example Cu, Mn, Ti, and V. The molar ratio of $Al_2O_3$ to $Na_2O$ is set to be approximately 1, due to the fact that particularly good toughening can be achieved in this way. However, a glass that is highly transparent in the entire wavelength range from 200 nm to 1500 nm is not feasible in this way.

Japanese patent JP 5540506 relates to alkali borosilicate glasses which exhibit good UV transmittance and good solarization resistance. The $SiO_2$ content is at most 75 wt % here. In addition to $SnO_2$, the composition of these glasses also includes $Nb_2O_5$ and $As_2O_5$. The content of $Fe_2O_3$ is between 1 ppm and 50 ppm. High light transmittance in the entire wavelength range from 200 nm to 1500 nm cannot be achieved with such glasses either.

International patent application WO 2017/070500 A1 describes a glass substrate for use as a microarray for a fluorescence detection method, which may, for example, also be suitable for microscope carrier glasses, petri dishes or other glass slides, for example with textures applied thereto or therein. All described glass substrates compulsorily have a content of $B_2O_3$. The achieved expansion coefficients range between 4.9 and $8.0*10^{-6}$/K. Furthermore, the glasses described in WO 2017/070500 A1 contain $SnO_2$.

International patent application WO 2017/070066 A1 describes the production of light guide plates from glass substrates, the glasses corresponding to those of International patent application WO 2017/070500 A1. In particular, the $SiO_2$ contents are between 65.79 mol % and 78.17 mol %, and the contents of $B_2O_3$ are between 0 and 11.16 mol % for the glass compositions described in WO 2017/070066 A1.

Japanese patent application JP 2010/208906 A relates to a glass which is stable against UV radiation with a wavelength of 365 nm. The base glass is a soda-lime glass and does not contain $B_2O_3$. Solarization is prevented by addition of $TiO_2$ in a content from 0.2 wt % to 2.0 wt %, an iron oxide content from 0.01 wt % to 0.015 wt %, and a controlled set redox ratio of $Fe^{2+}/Fe^{3+}$.

U.S. Pat. No. 4,298,389 discloses high transmittance glasses for solar applications. The optimized solar transmittance relates to the wavelength range from 350 nm to 2100 nm in this case. The base glass is an alumino-alkaline earth borosilicate glass with $B_2O_3$ contents from 2 wt % to 10 wt %. The $Fe_2O_3$ content is 200 ppm, with all iron being present in the trivalent oxidation state. UV transmittance is therefore extremely low.

U.S. patent application US 2014/0152914 A1 discloses a glass for application in touch screens, which is an aluminosilicate glass available under the brand "Gorilla" or trade name Gorilla glass.

European patent application EP 2 261 183 A2 discloses a highly transmissive glass sheet. The glass has a composition comprising $Na_2O$ and $CaO$ as well as $SiO_2$ and is free of $B_2O_3$. After UV irradiation, i.e. irradiation with a wavelength of up to 400 nm, this sheet is said to exhibit no reduction in transmittance in the visible spectral range.

DE 692 14 985 T2 relates to a borosilicate glass composition which is said to exhibit high spectral transmittance in the visible range but low UV transmittance. Glass sheets with such a composition serve in particular as a cover glass for gallium arsenide solar cells. The borosilicate glass has a thermal expansion coefficient of 6.4 to $7.0*10^{-6}$/K. $CeO_2$ is used as a UV blocker.

German patent document DE 43 38 128 C1 describes borosilicate glasses exhibiting high transmittance in the UV range and a low coefficient of thermal expansion in the range between $3.2*10^{-6}$/K and $3.4*10^{-6}$/K as well as high chemical resistance. Metallic silicon is used as a reducing agent. As a result, the fraction of $Fe^{2+}$ compared to $Fe^{3+}$ is high, which reduces transmittance in the near IR range.

Furthermore, German patent document DE 43 35 204 C1 describes a reducing molten borosilicate glass with high transmittance in the UV range (85% at 254 nm and at a thickness of the glass of 1 mm). The $SiO_2$ content is between 58 wt % and 65 wt %, and the coefficient of thermal expansion is 5 to $6*10^{-6}$/K. Carbon was used as a reducing agent in the melt.

German patent document DE 38 01 840 A1 relates to a UV-transparent borosilicate glass, for which sugar and metallic aluminum are used as the reducing agent, with a composition of 64 wt % to 66.5 wt % of $SiO_2$ and 20 wt % to 22.5 wt % of $B_2O_3$. The coefficient of thermal expansion is between $3.8*10^{-6}$/K and $4.5*10^{-6}$/K.

U.S. Pat. No. 4,925,814 describes a UV-transmissive glass comprising 60 mol % to 70 mol % of $SiO_2$ and 16 mol % to 20 mol % of $B_2O_3$. The coefficient of thermal expansion is in the range from $4.7*10^{-6}$/K to $6.2*10^{-6}$/K.

German patent application DE 10 2009 021 115 A1 discloses silicate glasses with high transmittance in the UV range. The glasses have an $SiO_2$ content between 65 wt % and 77 wt %, a $B_2O_3$ content between 0.5 wt % and 8 wt %, and furthermore a high content of alkali and alkaline earth metal ions. The coefficient of thermal expansion is between $9*10^{-6}$/K and $10*10^{-6}$/K. In order to reduce trivalent iron to divalent iron, carbon or metallic silicon is added.

German patent document DE 10 2012 219 614 B4 discloses a solarization-resistant borosilicate glass. The composition of this glass comprises 65 wt % to 85 wt % of $SiO_2$ and 7 wt % to 20 wt % of $B_2O_3$. Solarization resistance is achieved by a defined position of the UV edge (5% transmittance at about 280 nm, 0% transmittance at 256 nm, with a thickness of the glass of 1.3 mm). Thus, the glass does not transmit UV-C radiation. The specific location of the UV edge is achieved by a combination of $TiO_2$, $MoO_3$, and $V_2O_5$.

German patent application publication DE 25 19 505 describes a UV-transparent borosilicate glass comprising 61 wt % to 70 wt % of $SiO_2$ and 0.5 wt % to 3.5 wt % of $B_2O_3$, and an organic reducing agent is added to the glass. After UV irradiation the glass exhibits little solarization.

German patent application publication DE 38 26 586 A1 describes UV-transmissible alkali boro-aluminosilicate glasses. The coefficient of thermal expansion is in a range from $5.2*10^{-6}$/K to $6.2*10^{-6}$/K, while the content of $SiO_2$ is between 58 wt % and 62 wt %, and the content of $B_2O_3$ is between 15 wt % and 18 wt %. UV transmittance is at least 80% at a wavelength of 254 nm for a glass having a thickness of 1 mm. However, the glasses described therein have high coefficients of thermal expansion between $5.6*10^{-6}$/K and $6.2*10^{-6}$/K.

International patent application WO 2016/115685 A1 discloses glasses with a low coefficient of thermal expansion and at the same time high UV transmittance and solarization resistance. Two types of glass are described, namely an alkali-free alkaline earth borosilicate glass with a composition of 50 mol % to 75 mol % of $SiO_2$, 5 mol % to 20 mol % of $B_2O_3$ and an alkaline earth oxide content of 3 mol % to 25 mol % on the one hand, and on the other an alkaline earth-free alkali borosilicate glass with a composition of 78 mol % to 85 mol % of $SiO_2$, 5 mol % to 20 mol % of $B_2O_3$ and an alkali oxide content between 0 mol % and 13 mol %. The coefficient of thermal expansion is in the range between $2*10^{-6}$/K and $4*10^{-6}$/K. UV transmittance is said to be improved by adjusting the number of non-bridging oxygen atoms, that is by influencing the glass network structure. In this case, a transmittance of 51% at 248 nm and 88% at 308 nm was achieved with a high-purity glass with an $Fe_2O_3$ content of less than 0.01 mol %. However, a comparison of the high-purity glasses with glasses having significantly higher $Fe_2O_3$ contents reveals that the latter exhibit significantly reduced transmittance in the UV range, namely 10% at 248 nm and 61% at 308 nm. So, other than described it appears that not so much the number of non-bridging oxygen atoms is decisive for UV transmittance, but rather the content of impurities, in particular in the form of color-imparting ions, such as iron ions. It should be noted that the cited international patent application does not make any statements regarding the content of other color-imparting ions such as other 3d elements.

International Patent Application WO 2017/119399 A1 proposes three different types of glass, which are described as being highly transmissive in the visible spectral range with wavelengths from 380 nm to 780 nm. The described glass of type A is an alkaline earth aluminosilicate glass with high alkali content, the glass of type B is a borosilicate glass with a high alkali content, and the glass of type C is an alkali-free alkaline earth borosilicate glass. A low refractive index is not feasible with these glasses; the exemplary glasses in table 1 of international patent application WO 2017/119399 A1 all have a refractive index of more than 1.5.

International patent application WO 2017/052338 A1 describes a light guide plate made of glass with a composition of 75 wt % to 85 wt % of $SiO_2$, a $B_2O_3$ content of 5 wt % to 20 wt %, between 1 wt % and 5 wt % of $Al_2O_3$, and 3 wt % to 8 wt % of $R_2O$, where R stands for at least one of the elements lithium, sodium, or potassium, and less than 0.0025 wt % of $Fe_2O_3$.

Japanese patent application JP 2010/208906 A proposes a composition for a glass which is resistant to UV radiation. It is a soda-lime glass with a composition in the range of 66 wt % to 75 wt % of $SiO_2$, 0.1 wt % to 30 wt % of $Al_2O_3$, 5 wt % to 15 wt % of $Na_2O$, from 5 wt % to 15 wt % of $R_2O$ (where $R_2O$ is the sum of $Li_2O$, $Na_2O$, and $K_2O$), from 3 wt % to 10 wt % of CaO, between 0 wt % and 7 wt % of MgO, and a content of RO between 3 wt % and 18 wt % (where RO is the sum of the alkaline earth oxides CaO, MgO, BaO, and SrO), a fraction of iron oxides FeO and $Fe_2O_3$ between 0.005 wt % and 0.02 wt % in total, and a content of $TiO_2$ between 0.2 wt % and 2 wt %.

Japanese patent application JP 2015/193521 A discloses highly transmissive borosilicate glasses with a composition range of 50 wt % to 80 wt % of $SiO_2$, a content of 1 wt % to 45 wt % of the sum of $Al_2O_3$ and $B_2O_3$, a content between 0 wt % and 25 wt % of the sum of $Li_2O$, $Na_2O$, and $K_2O$, and a content between 0 wt % and 25 wt % of the sum of alkaline earth oxides MgO, CaO, SrO, and BaO. Furthermore, the sum of $Fe_2O_3$ and $TiO_2$ contents is said to be less than 100 ppm. The exemplary glasses all have a very low content of $SiO_2$ of about 65 wt %, and at the same time a high content of alkali oxides between about 8 wt % and 13 wt %. Accordingly, these are high-expansion glasses with a thermal expansion coefficient between about $5.5 \cdot 10^{-6}$/K and $7.5*10^{-6}$/K.

International patent application WO 2016/194780 A1 describes borosilicate glasses of high transmittance for electromagnetic radiation, especially in DUV, i.e. in the range of UV-C radiation, which come from the following composition range: $SiO_2$ between 55 mol % and 80 mol %, $B_2O_3$ between 12 mol % and 27 mol %, $Al_2O_3$ between 0 mol % and 3.5 mol %, the sum of the contents of $Li_2O$, $Na_2O$, and $K_2O$ between 0 mol % and 20 mol %, and a content of alkaline earth oxides RO between 0 mol % and 5 mol %. The exemplary glasses all have a high alkaline content and have coefficients of thermal expansion between $4*10^{-6}$/K and $7*10^{-6}$/K.

SUMMARY

For modern optical applications, however, increasingly complex requirements are imposed on the material glass. Fields of application for glasses are in the field of so-called UV curing, i.e. the curing of organic coating materials such as lacquers by high-energy UV radiation in the wavelength range from 200 nm to 380 nm, in the LED sector for LEDs in the UV range for which UV-transmissive planar glass covers are needed, and for windows, filters or encapsulations, for example for NIR cameras or radar or LiDAR applications, where high transmittance for radiation in the range from 850 nm to 1500 nm wavelength is necessary. Applications which require high transmittance of the glass material for radiation in the visible wavelength range, i.e. in the range of wavelengths from about 380 nm to about 780 nm, are also of great importance, and these include, for example, cover glasses for LEDs in the wavelength range of visible light, in particular at wavelengths between 380 nm and 700 nm, so-called light guide plates, or for example for LED-based light management, in particular for generating homogeneous white light without incurring a color shift at the edge in large-format displays of the so-called "slim design" with direct backlighting and/or indirect light irradiation, and in the latter case the entire wavelength range of the visible light from about 380 nm and to about 780 nm is of particular importance.

Further applications relate to so-called microarrays for diagnostics, for example, which requires thin glass substrates with very low intrinsic fluorescence and high light transmittance in the wavelength range from 380 nm to 780 nm.

A glass with a coefficient of thermal expansion matched to silicon is needed as a carrier glass for the manufacturing of ultra-thin silicon semiconductor wafers, and this glass should allow to perform UV debonding at about 254 nm.

Microwave transmissive glass substrates with transparency for radiation in the GHz range are needed for radio frequency applications, for example for novel flat antennas with low dielectric loss factor.

Based on these modern and often innovative fields of application for glass, the following advantageous requirements arise with regard to the properties of the glass substrate to be used: High UV transparency, especially in the wavelength range from 200 nm to 300 nm; High transparency in the visible range, i.e. from 380 nm to 780 nm; High transparency in the near infrared, i.e. in the wavelength range from 780 nm to 1500 nm; Low intrinsic fluorescence; High solarization resistance; Low light scattering; Low thermal expansion coefficient; High chemical resistance and low corrosion tendency; Minimum alkali migration in the glass, in particular no alkali release at the glass surface; Good mechanical stability and high resistance against abrasive attack on the glass surface by various media; Optimal dielectric properties: at 1 MHz $\varepsilon \leq 5$, tan $\sigma \leq 50*10^{-4}$.

However, what all the glasses mentioned above have in common is that they only cover parts of the stated requirements. For example, although it is possible with a specific change in the glass composition in the range of borosilicate glasses to optimize properties for specific applications, for example with regard to the possibility of high toughening and at the same time high transmittance for electromagnetic radiation in the visual spectral range (from about 380 nm to about 800 nm wavelength), as explained above, this comes with the drawback that a glass optimized in this way is not suitable for another application, for example implying high transmittance for radiation in the UV range (from about 200 nm to about 400 nm) and at the same time high solarization resistance. On the other hand, if glasses with rather high UV transmittance are obtained, these glasses generally exhibit very high coefficients of thermal expansion, which is unfavorable for applications in the field of printed circuit board fabrication (Si debonding). However, adjustments of glass compositions to specific applications are always associated with high expenditure.

An alternative to the aforementioned glasses could be the use of pure silica glass, $SiO_2$, which exhibits, for example, high UV transmittance and high chemical resistance. However, applications of pure silica glass are limited by the fact that this glass is very expensive due to the complexity of its fabrication. Furthermore, silica glass cannot be produced in the form of flat glass.

Thus, there is a need for a flat glass that exhibits high transmittance in the wavelength range from 200 nm to 1500 nm, preferably in particular with a low coefficient of thermal expansion, high chemical resistance, and mechanical strength and low refractive index, and which can be produced at low costs.

The object of the invention is to provide a flat glass which overcomes or at least mitigates the deficiencies of the prior art.

Accordingly, the invention relates to a flat glass, wherein at a thickness of the flat glass of 1 mm the flat glass exhibits a transmittance to electromagnetic radiation which is 20% or more, preferably 60% or more, more preferably 85% or more, and most preferably 88% or more at a wavelength of 254 nm; and/or which preferably is 82% or more, preferably 90% or more, more preferably 91% or more at a wavelength of 300 nm; and/or which preferably is 90% or more, preferably 91% or more at a wavelength of 350 nm; and/or which preferably is 92% or more, preferably 92.5% or more at a wavelength of 546 nm; and/or which preferably is 92.5% or more, preferably 93% or more at a wavelength of 1400 nm; and/or which preferably is 91.5% or more, preferably 92% or more in a wavelength range from 380 nm to 780 nm; and/or which preferably is 92.5% or more, preferably 93% or more in a wavelength range from 780 nm to 1500 nm.

Thicker or thinner flat glasses also come within the scope of the invention, if these thicker or thinner flat glasses also exhibit the values according to the independent claims at a thickness of 1 mm.

For determining whether they are within the scope of protection, thicker flat glasses can be thinned out to a thickness of 1 mm.

Thinner flat glasses can also be brought to a thickness of 1 mm, by stacking and possibly thinning, so that instead of converting it is also possible to make a physical measurement of transmittance to determine whether these thin flat glasses are within this scope of protection.

So, the flat glass according to the present invention exhibits broadband high transmittance for electromagnetic wavelengths in the range of wavelengths from 200 nm to 1500 nm.

In the context of the present invention, the following definitions shall apply:

For the purposes of the present invention, flat glass is understood to mean a glass body having a geometrical dimension in one spatial direction that is at least one order of magnitude smaller than in the other two spatial directions. In simple terms, therefore, the glass body has a thickness that is at least an order of magnitude smaller than its length and width. Flat glasses may for example come in the form of a ribbon so that their length is considerably greater than their width, or length and width may be of approximately the same magnitude, so that the flat glass is provided as a sheet.

In particular, flat glass is understood to mean a glass which is obtained as a sheet-like or ribbon-shaped body already from the production process. Therefore, not every sheet-like or ribbon-shaped body is to be understood as a flat glass in the sense of the present invention. For example, it would also be possible to prepare a glass sheet from a glass block by cutting and then grinding and/or polishing. More particularly, a flat glass within the scope of the present disclosure is obtained by a melting process with subsequent hot forming, in particular by a rolling process, a float process, or a drawing process, such as a down-draw process, preferably an overflow fusion down-draw process, or an up-draw process, or a Foucault process. The flat glass may be provided with a fire-polished surface, or else the surface may be treated after the hot-forming process in a cold post-processing step. The surface finish of the flat glass will differ depending on the selected hot forming process.

If reference is made to the coefficient of thermal expansion in the context of the present application, this is the coefficient of linear thermal expansion a, unless expressly stated otherwise, which is given for the range from 20° C. to 300° C. unless expressly stated otherwise. The expressions CTE, $\alpha$, and $\alpha_{20-300}$, and also generally 'thermal expansion coefficient' are used synonymously in the context of the present invention. The given value is the nominal coefficient of mean thermal expansion according to ISO 7991, which is determined by static measurement.

The transformation temperature $T_g$ is defined by the point of intersection of the tangents to the two branches of the expansion curve when measured at a heating rate of 5 K/min. This corresponds to a measurement according to ISO 7884-8 or DIN 52324.

Thus, according to the present invention, the flat glass is a flat, sheet-like or ribbon-shaped glass body which may in particular have native surfaces. In the context of the present invention, the two basic faces of the glass body are referred to as the surfaces of the flat glass, i.e. those surfaces which are defined by the length and the width of the glass body. The edge surfaces are not understood to be surfaces in this sense. First, they only account for a very small percentage area of the flat glass body, and second, flat glass bodies are usually cut into desired sizes according to customer or manufacturing specifications, from the flat glass body obtained from the manufacturing process, i.e. usually a glass ribbon.

The provisioning of the glass in the form of a flat glass according to the present invention has far-reaching advantages. Complex preparation steps are eliminated, which are not only time-consuming but also costly. Also, geometries feasible by the common flat glass manufacturing processes are easily accessible, especially large dimensions of the flat glass. Moreover, native surfaces of a glass, which are also referred to as fire-polished, determine the mechanical properties of the glass body, for example, reworking of the surface of a glass usually leads to a significant loss in strength. So, the flat glass according to the present invention preferably has a higher strength compared to reworked glasses.

As mentioned above, the flat glass according to the present invention exhibits broadband high transmittance for electromagnetic radiation in the entire range of wavelengths from 200 nm to 1500 nm, and thus achieves a degree of transmittance which has previously only been achieved with optical glasses in this quality. However, compared to these optical glasses, in particular to silica glass, the flat glass of the invention exhibits significantly enhanced meltability, especially in continuous melting units, so that it is for the first time that a glass with broadband transmittance for electromagnetic radiation in the entire wavelength range from 200 nm to 1500 nm is feasible in the form of a flat glass, both in terms of technology and economics.

In order to ensure good meltability and thus economical production of the flat glass, the flat glass comprises a total content of oxides of network formers, in particular of oxides of silicon and/or boron, of at most 98 mol % according to one embodiment.

It is a high content of network formers, in particular of $SiO_2$ and/or $B_2O_3$, in the flat glass according to embodiments of the invention, which allows to achieve these good transmission properties of the flat glass at all. As already mentioned above, pure silica glass (also referred to as quartz glass), $SiO_2$, exhibits very high broadband transmittance for electromagnetic radiation. However, a melt of pure $SiO_2$ is not feasible technologically.

Here, network formers are understood in Zachariasen's sense, i.e. they comprise cations predominantly having a coordination number of 3 or 4. These are in particular the cations of elements Si, B, P, Ge. Hereby, network formers are distinguished from network modifiers, such as Na, K, Ca, Ba, which usually have coordination numbers of 6 and more, and from intermediate oxides such as of Al, Mg, Zn, which mostly have oxidation numbers from 4 to 6.

Furthermore, it is known that even small amounts of impurities have a drastic, namely detrimental impact on the transmission properties of silica glass. Surprisingly, however, it has been found that even with a maximum content of network formers of 98 mol %, the above-described advantageous transmission properties can already be achieved for flat glass.

According to one embodiment, advantageously, the coefficient of linear thermal expansion a of the flat glass ranges between $2.4*10^{-6}$/K and $3.5*10^{-6}$/K.

Such a value of the coefficient of linear thermal expansion a is advantageous because it allows to better match the coefficient of thermal expansion, for example to the silicon that is commonly used in the printed circuit board industry. If quartz glass is used, for example, which has a very low coefficient of thermal expansion of only $0.5*10^{-6}$/K, thermal cycling stress can lead to cracking of silicon layers deposited on the quartz glass substrate. With flat glass according to the present embodiment, this is significantly reduced because of the advantageous coefficient of linear thermal expansion.

According to a further embodiment of the flat glass, the flat glass has a content of $SiO_2$ between 72 mol % and 85 mol %, preferably between 76 mol % and 85 mol %.

This is particularly advantageous because the meltability of the flat glass is again improved in this way. However, the content of $SiO_2$ of the flat glass should not be too low, in particular not less than 72 mol %, preferably not less than 76 mol %.

As is known to persons skilled in the art, simple colorless base glass systems such as silica glass (also known as quartz glass) $SiO_2$, but also pure borate glass $B_2O_3$ (and hypothetical pure phosphate glass $P_2O_5$, which cannot be prepared because of the high hygroscopicity of phosphorus oxide) exhibit very high transmission for radiation in the UV range. Commonly, in terms of their transmission properties, the glasses are described by the position of an absorption edge, for example the so-called UV absorption edge. The position of the absorption edge is usually specified by indicating the wavelength $\lambda_0$. The wavelength $\lambda_0$ for characterizing the UV absorption edge is the wavelength value obtained by linear extrapolation of the steeply sloping portion of the transmittance curve to the point of intersection with the $\lambda$ coordinate. The $\lambda_0$ values, in nm, of some colorless base glasses are listed below:

| | |
|---|---|
| $SiO_2$: | $\lambda_0$ = 162 nm |
| $B_2O_3$: | $\lambda_0$ = 200 nm |
| $HPO_3$: | $\lambda_0$ = 273 nm. |

Theoretically, pure phosphate glass of the composition $P_2O_5$ should have the smallest value for the absorption edge, however, it is impossible to prepare such glass, as stated above. The incorporation of water into glass leads to a shift of the here considered UV absorption edge towards higher wavelengths. Water-free $B_2O_3$ glass is also difficult to produce, so that pure water-free silica glass exhibits the highest UV transmittance of all glass systems, but as already stated, it is not feasible to prepare it in the form of flat glass, neither economically nor technologically.

A further shift of the transmission curve of $SiO_2$ or $B_2O_3$ base glass into the long-wave UV range is resulting when further oxides are incorporated into the $SiO_2$ or $B_2O_3$ base glasses, for example alkali oxides or alkaline earth oxides (also known as alkaline oxides). By incorporating such oxides, so-called separation site oxygen ions are generated in the glass structure (which are also referred to as "non-bridging oxygens" or NBO, for short). By way of example, the following estimation applies to the shift of the absorption edge by incorporation of a metal oxide $Me_xO_y$:

| | |
|---|---|
| $SiO_2 + Me_xO_y$ | shift of $\lambda_0$ from 162 nm to about 270 nm |
| $B_2O_3 + Me_xO_y$ | shift of $\lambda_0$ from 200 nm to about 360 nm. |

Here, "Me" refers to a metal which usually has the oxidation number y in oxides. The exact extent to which there is actually a shift in the absorption edge, in this case the UV absorption edge, depends on the nature of the metal, i.e., for example, whether it is an alkali metal or an alkaline earth metal, and for the exemplary case of alkali oxides on whether, for example, $Na_2O$ or $K_2O$ was specifically incorporated into the base glass.

UV absorption of the oxidic glasses primarily occurs due to the electrons of the oxygen ions, which are excited by the electromagnetic radiation. Solidly bonded oxygen ions need very high energy short-wave radiation for their excitation, whereas less solid oxygen bonds are already excited by lower energy long-wave UV radiation, especially due to the presence of the separation site oxygen ions (non-bridging oxygen, NBO).

According to one embodiment of the invention, the flat glass comprises $B_2O_3$, and preferably the flat glass has a content of $B_2O_3$ between 10 mol % and 25 mol %, most preferably between 10 mol % and 22 mol %. Although $B_2O_3$ in the form of pure borate glass exhibits a less favorable position of the UV absorption edge with regard to transmission properties, it has the advantage of having a lower melting point than $SiO_2$. However, an excessive content of $B_2O_3$ is unfavorable, because of the hygroscopicity of $B_2O_3$ and because of its tendency to evaporate from melts.

As mentioned above, pure silica glass is particularly advantageous in terms of the transmission properties of a glass, but cannot be produced in the form of a flat glass, for technological and economic reasons. So, if, for example for reasons of technological and/or economic feasibility of a flat glass, the total content of oxides of network formers in the flat glass is limited according to embodiments of the invention, i.e. is at most 98 mol %, preferably at most 85 mol %, the further components of the flat glass are of particular importance.

Therefore, according to a further embodiment of the invention, the flat glass comprises $SiO_2$ and $B_2O_3$.

In fact, it is practically feasible to obtain $SiO_2$ and $B_2O_3$ as a glass in almost any mixture together with other cations, in particular "alkaline" cations such as $Na^+$, $K^+$, $Li^+$, $Ca^{2+}$. However, if a glass with particularly high transmittance for electromagnetic radiation in the entire range of wavelengths from 200 nm to 1500 nm is to be achieved, in particular for example a flat glass, then it has to be considered, besides the purely practical limits given by the production conditions, in particular with regard to devitrification tendency, meltability, and/or moldability, and chemical resistance, that particularly advantageous optical properties are achieved by a high content of the oxides $SiO_2$ and $B_2O_3$ in total.

Preferably, therefore, the flat glass comprises $SiO_2$ and $B_2O_3$, and particularly preferably the following applies: $\Sigma(SiO_2+B_2O_3)$ is 92 mol % to 98 mol %.

Preferably, the content of alkali oxides in the flat glass is minimized. According to one embodiment of the invention: $\Sigma R_2O$ 1 mol %-5 mol %, wherein $R_2O$ stands for alkali metal oxides.

What is decisive for particularly advantageous properties of the flat glass, in particular with regard to a particularly favorable position of the UV absorption edge (i.e. for the lowest possible $\lambda_0$) is the molar ratio of the constituents of the glass relative to each other.

According to a further embodiment, the following applies with regard to the ratio of the molar amounts of the constituents of the flat glass:

| | |
|---|---|
| $B_2O_3/SiO_2$ | 0.12 to 0.35, and/or |
| $\Sigma(Me_xO_y)/(\Sigma(SiO_2 + B_2O_3))$ | 0.02 to 0.10, | wherein Me represents a metal which usually has an oxidation number y in oxides, in particular one of an alkali metal and/or alkaline earth metal, and aluminum.

In other words, according to one embodiment, the sum of all metal oxides in the flat glass is minimized and is small compared to the sum of the main components.

Here, "Me" refers to a metal which is usually present in oxides with the oxidation number y. In particular, Me may be an alkali metal or an alkaline earth metal, or else aluminum, for example. As a matter of fact, it is also possible that the glass composition comprises a plurality of metal ions "Me". The term "metal ion" is understood to be independent of the oxidation number, so that the flat glass may comprise the respective substance in metallic form, for example, but especially also in the form of an ion or an oxide. Usually, metals will be present in the form of ions in the oxidic glasses that are considered here. It should also be taken into account that the ions occur in different oxidation states (so-called polyvalent ions), especially in the case of the transition metals. In this sense, the wording "usual oxidation number" means the one with which a respective oxide is usually specified or designated, for example when an analysis of a composition is given. For example, the content of chromium of a glass, such as a flat glass, is usually given as a percentage of $Cr_2O_3$ (i.e. with the oxidation number 3 of chromium), even if other oxidation numbers are possible. In the context of the present invention, unless expressly stated otherwise, always the total content of a substance is indicated, irrespective of its oxidation state.

A molar ratio of $B_2O_3$ to $SiO_2$ within the limits between 0.12 and 0.35 is particularly advantageous because it is possible in this way to prevent or at least minimize structural inhomogeneities that might arise, for example due to demixing processes, in the system $SiO_2$—$B_2O_3$ as well as in ternary systems which comprise yet another metal oxide $Me_xO_y$ in addition to $SiO_2$ and $B_2O_3$. In fact, structural inhomogeneities which may occur due to demixing processes in the form of microphase separation in a glass, for example a flat glass, also contribute to UV absorption, in particular through light scattering.

According to a further embodiment of the invention, the following applies with regard to the ratio of weight fractions of the iron ions contained in the flat glass:

$$\leq Fe^{2+}/(Fe^{2+}+Fe^{3+})\leq 0.3.$$

This value is also referred to as redox ratio.

In other words, the content (by mass) of bivalent iron in the flat glass is between at least 10% and at most 30%, based on the total of iron ions contained in the flat glass.

Iron constitutes an unavoidable impurity resulting from the production raw materials. And, iron is typically the major impurity, i.e. other impurities are usually contained in smaller quantities in the glass, for example a flat glass.

Surprisingly, it has been found that with a redox ratio for iron in the aforementioned limits, particularly advantageous transmission properties are achieved, especially a particularly high transmittance of the flat glass for electromagnetic radiation in the entire range of wavelengths from 200 nm to 1500 nm.

It is particularly surprising, that the advantageous high transmission properties for electromagnetic radiation are achieved just with such a redox ratio, since until now the intention has been to minimize the content of bivalent iron as far as possible. For example, for glass according to US 2017/0052311 A1, a redox ratio of preferably less than 5% was specified to be particularly preferred. However, the redox ratio precisely adjusted within the limits given above provides for an optimum trade-off, so that high transmission for a flat glass can now be achieved for UV radiation as well as in the visible and near IR range of the electromagnetic spectrum.

According to a further preferred embodiment, the content of polyvalent metal ions, for example ions of the so-called transition metals, is specifically minimized in the flat glass.

It is known that in particular polyvalent metal ions, for example ions of the so-called transition metals, may have a color-imparting effect in a glass. Although it is not possible to directly apply the ligand field theory to a glass comprising color-imparting ions, the principles of ligand field theory can similarly applied to glasses comprising ions. However, in this case it has additionally to be taken into account that the base glass also has a significant influence on the resulting coloration, as well as other constituents contained in the glass, such as the type and concentration of any network modifiers possibly contained in the glass, for example. Therefore, the absorption ratios in a glass are difficult to predict, and generalizations are only permitted to a limited extent.

The inventor has now succeeded in determining, at least for alkali borosilicate glass with low alkali content, the color-imparting or absorption power or, more generally, the absorption behavior in the wavelength range from 200 nm to about 1500 nm of different metals or elements or ions thereof, for example of transition metals or their ions, which are frequently contained in glasses, for example as impurities. These transition metals or their ions, which are frequently contained in glasses, in particular include the transition metals of the third period of the periodic table (known as 3d elements), in particular $Fe^{2+/3+}$, $Co^{2+}$, $Ni^{2+}$, $Cr^{3+}$, $Cu^{2+}$, $Mn^{2+}$, $V^{5+}$, and $Ti^{4+}$. As already mentioned above, the oxidation number or valence of the ions is indicated here with the oxidation numbers usually specified for the relevant element. In particular the transition metals are polyvalent ions which change from one oxidation state to another rather easily and may exist in different oxidation states, sometimes even in many different oxidation states, as is known in particular for manganese and chromium. This specific (dimensionless) color-imparting effect or, more generally, absorption power for the most frequently occurring color-imparting impurities, such as 3d transition metal ions, is listed below, based on a concentration of the respective ion of 1 ppm (by weight):

| Element | Absorption power/ppm |
|---|---|
| $Fe^{2+/3+}$ | 1 |
| $Co^{2+}$ | 300 |
| $Ni^{2+}$ | 70 |
| $Cr^{3+}$ | 50 |
| $Cu^{2+}$ | 20 |
| $Mn^{2+}$ | 5 |
| $V^{5+}$ | 2 |
| $Ti^{4+}$ | 0.5 |

Here, again, the valences of the respective metal ions are to be considered as the "most common" or "usual" oxidation state or valence. Usually, it cannot be determined in which oxidation state a polyvalent ion is actually present. It is therefore necessary to consider the total content of the respective metal or its ions in the glass composition.

The above list shows that it is not only the total content of impurities which has to be taken into account for the optical properties, for example for the absorption behavior in the range of electromagnetic wavelengths from 200 nm to 1500 nm, in particular for the absorption behavior in the range of electromagnetic wavelengths from 200 nm to 1200 nm. Rather, the contents of impurities have to be considered in a weighted manner.

Therefore, advantageously, the following applies to the glass according to one embodiment.

$\Sigma(1*Fe+300*Co+70*Ni+50*Cr+20*Cu+5*Mn+2*V)$
[ppm by mass]

is less than 200 ppm, preferably less than 150 ppm, more preferably less than 100 ppm, yet more preferably less than 50 ppm, and most preferably less than 25 ppm, wherein the total content of the considered metals is considered irrespective of the oxidation state thereof.

Here, the element names represent the total content of the respective element in the flat glass, irrespective of its oxidation state, indicated in ppm, the ppm being based on the mass in each case.

This specified summary color value has to be understood as the maximum permissible limit value. So, the respective color-imparting 3d transition metal ion must not be present in any concentration. In order to achieve particularly high transmission or particularly low absorption, the contents of strongly color-imparting ions have to be adjusted in complementary manner to be lower according to their greater color-imparting effect relative to the generally higher main impurity iron (Fe) in the glass, i.e. the flat glass in this case.

Through this specific minimization of the content of strongly color-imparting metals or their ions it is possible to achieve particularly low absorption and accordingly particularly high transmission of the flat glass for electromagnetic radiation in the wavelength range from 200 nm to 1500 nm. Also, for the first time, a relationship has successfully been established between the matrix of a glass, here a borosilicate glass with low alkali content, and color-imparting impurities, and the main impurity iron.

The influence of these ions on light transmittance depends on their valence which in turn depends on the oxygen partial pressure at which the glass melt is in equilibrium. Industrial glass melts always contain a plurality of polyvalent ions at the same time, which may interact. The concentration of oxidation states may then change.

Therefore, an exchange of electrons between pairs of polyvalent ions has an enormous influence on the intended adjustment of product properties (light transmittance).

The concentration of these oxide states is influenced in particular by: the purity of the glass raw materials and glass cullet and the introduction of color-imparting 3d elements through interactions between the molten glass and the refractory material of the melting unit (glass corrosion).

What is therefore preferably used for the melting of borosilicate glasses according to embodiments of the present specification are extremely corrosion-resistant melt-cast refractory materials which have a $ZrO_2$ content of min. 90 wt % (generic term: HZFC—high zirconia fused cast). These materials guarantee minimal introduction of impurities into the molten glass.

Trade names of such HZFC products include, for example:

| | |
|---|---|
| ZB-X 9510 (ASAHI/Japan) | with 94.5% $ZrO_2$ |
| Monofrax Z (Monofrax/U.S.A.) | with 94% $ZrO_2$ |
| ER 1195 (SEFPRO/France) | with 94% $ZrO_2$. |

The AZS type melt-cast refractory materials with $ZrO_2$ contents from 32 to 41 wt % as commonly used in industrial glass melting for special glasses do not meet the requirements.

Furthermore, preferably, what has to be used for direct glass contact at highly stressed locations (e.g. wall, flow, refining chamber, homogenization chamber, stirrer, tweel, etc.) for melting borosilicate glasses according to embodiments of the present specification are: special refractory metals such as molybdenum or tungsten (manufacturer Plansee, HC Starck, etc.); and special refractory precious metal alloys such as platinum/rhodium, platinum/iridium, and platinum/gold (manufacturer Umicore/Belgium, Heraeus/DE, Tanaka/Japan etc.).

In order to meet the transmission requirements of the borosilicate glasses according to embodiments of the present specification, the impurity content in the employed raw materials has to be defined, in particular the content of 3d elements and other polyvalent ions.

In the case of the borosilicate glasses according to embodiments of the present specification, the 3d elements are introduced essentially via the $SiO_2$ carriers (prepared natural quartz sands), since the $SiO_2$ content of these glasses is about 75-80 wt %/o.

For example, $SiO_2$ carriers with $Fe_2O_3$ contents from 150 to 500 ppm are used for producing borosilicate glasses of the Pyrex type, i.e. a known type of commercially available borosilicate glasses.

Example

| | | |
|---|---|---|
| Sand- und Tonwerke Waalbeck | Qual. no. 3 | max. 500 ppm $Fe_2O_3$ |
| | Qual. no. 3s | max. 150 ppm $Fe_2O_3$ |

By contrast, for producing the borosilicate glasses according to embodiments of the present specification, purer $SiO_2$ sands have to be used.

Examples

| | | |
|---|---|---|
| Dorfner/Germany | Hi-Pu 005 | max. 65 ppm $Fe_2O_3$ |
| Sigrano/The Netherlands | MAM1U | max. 50 ppm $Fe_2O_3$ |
| Sasil/Italy | Bianco Neve | max. 40 ppm $Fe_2O_3$ |
| The Quartz Corp./U.S.A. | SP2-C | max. 30 ppm $Fe_2O_3$ |
| | SP2 | max. 15 ppm $Fe_2O_3$ |
| Brementhaler Quarzit/Germany | Sipur Al | max. 10 ppm $Fe_2O_3$ |
| KMC Corp./Japan | 30C | max. 30 ppm $Fe_2O_3$ |
| | 5C-E | max. 5 ppm $Fe_2O_3$ |

These raw materials have already been used on an industrial scale, for example for producing highly transmissive borosilicate flat glasses.

The remaining borosilicate glass raw materials (carriers of $Al_2O_3$, alkali oxides, alkaline earth oxides, and $B_2O_3$) can be produced synthetically and will only introduce a small amount of 3d elements.

As a matter of course, the use of natural raw materials such as feldspar and rasorite must be dispensed with in the production of borosilicate glasses according to embodiments of the present specification.

Another source for the introduction of 3d elements is glass cullet. In the manufacturing of borosilicate glasses, cullet contents of 30 to 70% are used in the batch, for technological reasons. Only own cullet (from internal glass production, such as from quality losses, glass breakage, cutting losses, etc.) is used. This glass cullet must be prepared before reuse—crushed to about <20 mm cullet size. Glass preparation is performed in crushers (jaw crushers, roller crushers, etc.). This generates abraded matter from the crushing tools (Fe, Cr, Mn, etc.), which is introduced into the glass melt through the cullet. For producing borosilicate glasses according to embodiments of the present specification, the introduction of such abraded matter has to be minimized.

Measures for this include: removal of abraded matter using high-field magnetic separators (about 70-80% is removed); removal of abraded matter by screening the fine fraction <5 mm (about 85-95%); prevention of abrasion by crushing technologies without metallic wearing tools (counterflow processes, detonation processes, etc.); and minimization of cullet content to ≤20% in the batch.

Nowadays, technical borosilicate glasses are produced in glass melting tanks. The sub-processes of melting the batch, degassing, and refining are performed adjacent to one another in the same aggregate. Heating of the melting units is usually accomplished in recuperative or regenerative manner using oil or gas as a fuel and air as an oxygen supplier.

The borosilicate glasses according to embodiments of the present specification are preferably melted in oxy-fuel tanks (natural gas oxygen burners). Homogenization of the glass takes place in an aggregate arranged downstream the melting tank and made of refractory precious metal.

The oxygen chemistry of the glass melt has a great influence on the light transmittance of the molten glasses.

Oxygen partial pressure $pO_2$ describes the reactivity (or chemical potential) of the dissolved component oxygen in the melt.

Commercial Na—Ca flat glasses are refined using Na sulfate. This sulfate refining is always adjusted so as to be reducing, in view of good refining. Therefore, the oxygen partial pressure ($pO_2$) in the glass melt is low (<0.35 bar). Consequently, the content of $Fe^{2+}$ is high, so that a blue-green color appearance is resulting due to the absorption in NIR. In order to obtain glass with less $Fe^{2+}$, additional measures are necessary, such as chemical discoloration using $CeO_2$ or else $Cr_2O_3$:

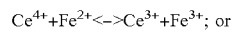

$Ce^{4+}+Fe^{2+}<->Ce^{3+}+Fe^{3+}$; or physical discoloration (overstaining) using selenium or rare earths ($Er_2O_3$).

However, both measures cause a decrease in transmittance in the UV-VIS.

Refining agents that are in particular used for the borosilicate glasses according to embodiments of the present specification include alkali halides, preferably NaCl.

At 1450° C. and above, evaporation of NaCl occurs. The multitude of rapidly forming/growing bubbles entails an intensive mixing of the molten glass and removes dissolved gases/$N_2$, $H_2O$, $CO_2$, etc.). Reducing burner setting is not required. The tank melt of borosilicate glasses according to embodiments is in particular heated with natural gas/oxygen burners.

Preheating of the $O_2$ carrier as in the case of air is not necessary.

The tank burners are preferably constantly operating burners, a replacement of burners as in regenerative systems is not necessary.

Usually, the tank burners are set to be slightly oxidizing.

The ratio of natural gas to $O_2$ is 1:2.2-2.3; a stoichiometric ratio for combustion would be approximately 1:2.1 (depending on the methane content of the natural gas). Depending on requirements, more strongly oxidizing or even reducing settings are possible.

In a borosilicate glass melting tank, 5 to 10 burners are usually arranged on both sides along the longitudinal extension of the tank. Varying the ratio of gas to $O_2$ enables to influence the $pO_2$ in the molten glass and hence to adjust the desired redox ratios of the polyvalent ions.

Preferably, the $pO_2$ in the molten glass is measured electrochemically by electrodes, directly through the bottom of the tank at different locations.

Further alternative or additional options for selectively adjusting the redox ratios include, for example: Use of $O_2$-containing raw materials which release $O_2$ under decomposition and offset the $Fe^{2+}/Fe^{3+}$ ratio towards $Fe^{3+}$; Use of $NaNO_3$ as a $Na_2O$ carrier instead of the commonly used $Na_2CO_3$; Use of $KNO_3$ as a $K_2O$ carrier instead of the commonly used $K_2CO_3$; Bubbling using $O_2$ gas (gas injection).

Bubbling is a process for influencing glass flows in the melting tank by an artificially created curtain of bubbles that are steadily rising from the bottom of the tank. For this purpose, bubbling nozzles are arranged on the bottom of the tank near the source point. The bubble-producing gas (usually air or $N_2$) is forced through the blowing nozzles on the bottom of the tank and into the molten glass.

Preferably, pure oxygen ($O_2$) is used as the bubble-generating gas for borosilicate glasses according to embodiments of the present specification. This is another possibility to selectively influence the desired redox ratios, for example also by the number of nozzles, a blowing nozzle throughput from 0 to 200 l/h, the blowing nozzle pre-pressure, etc.

All these measures for adjusting a defined redox ratio are known in the art and to persons of ordinary skill in the art.

According to a further embodiment, the transformation temperature $T_g$ of the flat glass is between 450° C. and 550° C.

The transformation temperature $T_g$ is defined by the point of intersection of the tangents to the two branches of the expansion curve when measured at a heating rate of 5 K/min. This corresponds to a measurement according to ISO 7884-8 or DIN 52324.

According to yet another embodiment, the flat glass has a viscosity η, wherein lg η has a value of 4 at temperatures between 1000° C. and 1320° C. A glass of such a composition is easy to process and is in particular also suitable for a flat glass fabrication process. In particular, it is possible in this way to produce flat glasses with a particularly low surface roughness $R_a$ of less than 2 nm.

Another advantage of a flat glass according to one embodiment is the low refractive index. According to one embodiment, the refractive index $n_d$ of the flat glass is less than 1.475 at a light wavelength of 587.6 nm.

Particularly advantageously, an embodiment of the flat glass is distinguished by values of chemical resistance
- against water according to DIN ISO 719 class HGB 1;
- against acids according to DIN 12116 class S 1 W; and
- against alkalis according to DIN ISO 695 class A3 or better.

Such (high) values of chemical resistance of the flat glass are advantageous, since in this way the flat glass can be applied in diverse processes in which partly aggressive media might come into contact with the surface of the flat glass, for example in the chip industry, but also in other fields. In particular the low content of alkalis in the flat glass is of advantage here. However, not only the content of alkalis in a glass, e.g. a flat glass, is decisive for its chemical resistance, but also the type of bonding of the alkalis in the glass matrix. The high values for chemical resistance of the flat glass according to one embodiment are thus attributable to a low total alkali content on the one hand in combination with the particularly strong structural bonding of the alkalis in the glass matrix on the other hand.

According to another preferred embodiment, the flat glass comprises the following constituents:

| | |
|---|---|
| $SiO_2$ | 72 mol % to 85 mol %, preferably 76 mol % to 85 mol %, |
| $B_2O_3$ | 10 mol % to 25 mol %, preferably 10 mol % to 22 mol %, |
| $Al_2O_3$ | 0.2 mol % to 2.5 mol %, |
| $Na_2O$ | 0.5 mol % to 5.0 mol %, |
| $K_2O$ | 0 mol % to 1.0 mol %, |
| $Li_2O$ | 0 mol % to 1.5 mol %, | wherein, preferably, the sum of alkali metal oxides $Na_2O$, $K_2O$, $Li_2O$ contained in the flat glass, preferably the sum of all alkali metal oxides contained in the flat glass, amounts to less than 5 mol % in total.

According to one embodiment, the flat glass is produced or producible by a melting process with subsequent hot forming, in particular in a float process, a rolling process, or a drawing process such as a down-draw process, preferably an overflow fusion down-draw process, or an up-draw process, or a Foucault process.

Examples

Table 1 below shows the compositions of flat glasses exhibiting high transmittance in the wavelength range from 200 nm to 1500 nm. The following Table 2 includes compositions of comparative glasses.

The abbreviation 'ND' stands for 'not detectable', here.

TABLE 1

Examples of selected flat glasses exhibiting high transmittance in a range of wavelengths from 200 nm to 1500 nm

| Glass | | 1 | 2 | 3 | 4 | 5 | 6 | 7 |
|---|---|---|---|---|---|---|---|---|
| $SiO_2$ | mol % | 83.0 | 83.0 | 83.4 | 83.4 | 83.4 | 83.2 | 83.8 |
| $B_2O_3$ | mol % | 11.5 | 11.5 | 11.2 | 11.2 | 11.2 | 13.3 | 12.9 |
| $Al_2O_3$ | mol % | 1.5 | 1.5 | 1.5 | 1.5 | 1.5 | 0.7 | 0.7 |
| $Na_2O$ | mol % | 4.0 | 4.0 | 3.5 | 3.5 | 3.5 | 2.8 | 1.2 |
| $K_2O$ | mol % | — | — | 0.4 | 0.4 | 0.4 | — | 0.6 |
| $Li_2O$ | mol % | — | — | — | — | — | — | 0.8 |
| others | mol % | — | — | — | — | — | — | — |
| $\Sigma(SiO_2 + B_2O_3)$ | | 94.5 | 94.5 | 94.6 | 94.6 | 94.6 | 96.5 | 96.7 |
| $\Sigma R_2O$ mol % | | 4.0 | 4.0 | 4.1 | 4.1 | 4.1 | 2.8 | 2.6 |
| $\Sigma(R_2O + Al_2O_3)/\Sigma(SiO_2 + B_2O_3)$ | | 0.0582 | 0.0582 | 0.0571 | 0.0571 | 0.0571 | 0.0363 | 0.0341 |
| $B_2O_3/SiO_2$ | | 0.1386 | 0.1386 | 0.1343 | 0.1343 | 0.1343 | 0.1599 | 0.1539 |
| $Fe^{3+}$ | ppm | 50 | 70 | 30 | 5 | 1.5 | 30 | 45 |
| $Cr^{3+}$ | ppm | 1.1 | 1.2 | 0.4 | 0.2 | 0.1 | 0.5 | 0.5 |
| $Ni^{2+}$ | ppm | 0.1 | 0.1 | 0.02 | 0.02 | 0.02 | 0.20 | 0.25 |
| $Co^{2+}$ | ppm | 0.05 | 0.10 | 0.01 | 0.01 | 0.01 | 0.05 | 0.1 |
| $Cu^{2+}$ | ppm | 0.40 | 0.26 | 0.2 | 0.2 | 0.2 | 0.25 | 0.23 |
| $Mn^{2+}$ | ppm | 1.1 | 1.3 | 0.4 | 0.3 | 0.3 | 0.4 | 0.95 |
| $V^{5+}$ | ppm | 2.1 | 2.3 | 0.5 | 0.4 | 0.2 | 1.3 | 1.5 |
| Absorption power ppm | | 138 | 185 | 61 | 36 | 16 | 94 | 130 |
| Ce | ppm | <1 | <1 | <1 | <1 | <1 | <1 | <1 |
| As | ppm | ND | ND | ND | ND | ND | ND | ND |
| Sb | ppm | ND | ND | ND | ND | ND | ND | ND |
| Sn | ppm | ND | ND | ND | ND | ND | ND | ND |
| S | ppm | ND | ND | ND | ND | ND | ND | ND |
| $H_2O$ | mmol $l^{-1}$ | 37.6 | 36.5 | 32.5 | 33.4 | 34.2 | 31.8 | 30.6 |
| σ | g $cm^{-3}$ | 2.22 | 2.22 | 2.22 | 2.22 | 2.22 | 2.18 | 2.175 |
| a | $10^{-6} K^{-1}$ | 3.29 | 3.29 | 3.28 | 3.28 | 3.28 | 2.77 | 2.60 |
| Tg | ° C. | 533 | 533 | 528 | 522 | 528 | 530 | 527 |
| L4 | ° C. | 1252 | 1252 | 1275 | 1275 | 1275 | 1260 | 1283 |

TABLE 1-continued

Examples of selected flat glasses exhibiting high transmittance in a range of wavelengths from 200 nm to 1500 nm

| | | | | | | | | |
|---|---|---|---|---|---|---|---|---|
| L3 | ° C. | 1504 | 1504 | 1538 | 1538 | 1538 | 1512 | 1537 |
| $n_d$ | | 1.472 | 1.472 | 1.471 | 1.471 | 1.471 | 1.470 | 1.469 |
| Transmittance 1 mm | | | | | | | | |
| @ 250 nm % | | | 20.0 | 32.9 | 86.9 | 90.1 | | |
| 300 nm % | | | 82.7 | 87.1 | 92.1 | 92.2 | | |
| 546 nm % | | | 92.7 | 92.8 | 93.1 | 93.2 | | |
| 1400 nm % | | | 93.1 | 93.2 | 93.3 | 93.3 | | |
| H | ISO 719 | HGB 1 | HGB 1 | HGB 1 | HGB 1 | HGB 1 | HGB 1 | HGB 1 |
| S | ISO 1776 | S 1 | S 1 | S 1 | S 1 | S 1 | S 1 | S 1 |
| L | ISO 695 | L A2 | L A2 | L A2 | L A2 | L A2 | L A3 | L A3 |
| Dielectric constant | | | | | | | | |
| at 5 GHz | | 4.4 | 4.4 | 4.5 | 4.5 | 4.5 | 4.1 | 4.1 |
| Dissipation factor | | | | | | | | |
| at 5 GHz | | 0.0038 | 0.0038 | 0.0037 | 0.0037 | 0.0037 | 0.0030 | 0.0025 |

| | Glass | 8 | 9 | 10 | 11 | 12 | 13 |
|---|---|---|---|---|---|---|---|
| $SiO_2$ | mol % | 82.2 | 80.4 | 76.7 | 74.9 | 75.4 | 75.8 |
| $B_2O_3$ | mol % | 15.0 | 16.9 | 20.5 | 21.8 | 21.8 | 21.8 |
| $Al_2O_3$ | mol % | 0.6 | 0.6 | 0.6 | 0.7 | 0.7 | 0.7 |
| $Na_2O$ | mol % | 0.5 | 0.5 | 0.5 | 1.1 | 0.6 | 0.6 |
| $K_2O$ | mol % | 0.7 | 0.6 | 0.7 | 0.5 | 0.5 | 0.3 |
| $Li_2O$ | mol % | 1.0 | 1.0 | 1.0 | 1.0 | 1.0 | 0.8 |
| others | mol % | — | — | — | — | — | — |
| $\Sigma(SiO_2 + B_2O_3)$ | | 97.2 | 97.3 | 97.2 | 96.7 | 97.2 | 97.6 |
| $\Sigma R_2O$ mol % | | 2.2 | 2.1 | 2.2 | 2.6 | 2.1 | 1.7 |
| $\Sigma(R_2O + Al_2O_3)/\Sigma(SiO_2 + B_2O_3)$ | | 0.0288 | 0.0277 | 0.0288 | 0.0341 | 0.0288 | 0.0246 |
| $B_2O_3/SiO_2$ | | 0.1825 | 0.2102 | 0.2673 | 0.2911 | 0.2891 | 0.2876 |
| $Fe^{3+}$ | ppm | 15 | 35 | 25 | 9 | 5 | 7 |
| $Cr^{3+}$ | ppm | 3.0 | 0.5 | 0.3 | 0.2 | 0.2 | 0.2 |
| $Ni^{2+}$ | ppm | 0.15 | 0.3 | 0.2 | 0.1 | 0.1 | 0.1 |
| $Co^{2+}$ | ppm | 0.01 | 0.1 | 0.1 | 0.05 | 0.04 | 0.04 |
| $Cu^{2+}$ | ppm | 2.0 | 0.14 | 0.25 | 0.13 | 0.1 | 0.10 |
| $Mn^{2+}$ | ppm | 0.3 | 0.4 | 0.35 | 0.28 | 0.25 | 0.31 |
| $V^{5+}$ | ppm | 0.4 | 1.2 | 0.9 | 0.5 | 0.3 | 0.4 |
| Absorption power ppm | | 48 | 118 | 93 | 46 | 38 | 40 |
| Ce | ppm | <1 | <1 | <1 | <1 | <1 | <1 |
| As | ppm | ND | ND | ND | ND | ND | ND |
| Sb | ppm | ND | ND | ND | ND | ND | ND |
| Sn | ppm | ND | ND | ND | ND | ND | ND |
| S | ppm | ND | ND | ND | ND | ND | ND |
| $H_2O$ | mmol $l^{-1}$ | 38.7 | 39.9 | 41.5 | 42.9 | 42.1 | 40.8 |
| σ | g cm$^{-3}$ | 2.17 | 2.16 | 2.145 | 2.13 | 2.12 | 2.11 |
| a | $10^{-6} K^{-1}$ | 2.65 | 2.85 | 3.07 | 3.29 | 3.04 | 2.78 |
| Tg | ° C. | 517 | 500 | 486 | 467 | 510 | 530 |
| L4 | ° C. | 1264 | 1224 | 1184 | 1143 | 1204 | 1290 |
| L3 | ° C. | 1526 | 1471 | 1430 | 1377 | 1456 | 1544 |
| $n_d$ | | 1.467 | 1.466 | 1.464 | 1.465 | 1.464 | 1.463 |
| Transmittance 1 mm | | | | | | | |
| @ 250 nm % | | 63.3 | | | | | |
| 300 nm % | | 90.1 | | | | | |
| 546 nm % | | 93.0 | | | | | |
| 1400 nm % | | 93.3 | | | | | |
| H | ISO 719 | HGB 1 | HGB 1 | HGB 1 | HGB 1 | HGB 1 | HGB 1 |
| S | ISO 1776 | S 1 | S 1 | S 1 | S 1 | S 1 | S 1 |
| L | ISO 695 | L A3 | L A3 | L A3 | L A3 | L A3 | L A3 |
| Dielectric constant | | | | | | | |
| at 5 GHz | | 4.1 | 4.0 | 4.0 | 3.95 | 3.9 | 3.9 |
| Dissipation factor | | | | | | | |
| at 5 GHz | | 0.0021 | 0.0020 | 0.0019 | 0.0018 | 0.0016 | 0.0015 |

TABLE 2

Comparative glasses

| Glass | | A | B | C | D | E | F | G | H | I | J | M |
|---|---|---|---|---|---|---|---|---|---|---|---|---|
| $SiO_2$ | mol % | 71.3 | 69.1 | 81.4 | 73.4 | 69.9 | 82.6 | 68.2 | 66.8 | 67.3 | 65.5 | 82.6 |
| $B_2O_3$ | mol % | — | — | 9.4 | — | 7.6 | 11.6 | 7.9 | — | 4.3 | — | 11.7 |
| $Al_2O_3$ | mol % | 0.6 | 0.2 | 2.6 | — | 2.6 | 1.3 | 10.6 | 4.4 | 12.6 | 8.4 | 1.5 |
| $Na_2O$ | mol % | 12.7 | 13.0 | 5.0 | 8.4 | 6.4 | 4.3 | — | 4.6 | 13.8 | 12.1 | 3.8 |
| $K_2O$ | mol % | 0.2 | 0.02 | 0.5 | 5.7 | 5.8 | 0.1 | — | 4.8 | — | 4.1 | 0.4 |
| $Li_2O$ | mol % | — | — | — | — | — | — | — | — | — | — | — |
| MgO | mol % | 5.9 | 6.7 | — | — | — | — | 7.2 | 3.6 | 2.0 | 8.9 | — |
| CaO | mol % | 8.9 | 10.9 | 1.1 | 8.1 | — | — | 3.7 | 5.9 | — | 0.2 | — |
| ZnO | mol % | — | — | — | 3.3 | 4.4 | — | — | — | — | — | — |
| SrO | mol % | — | — | — | — | — | — | 2.2 | 4.4 | — | — | — |
| BaO | mol % | — | — | — | 0.9 | — | — | — | 3.6 | — | 0.1 | — |
| $TiO_2$ | mol % | — | — | — | 0.2 | 3.3 | — | — | — | — | — | — |
| $ZrO_2$ | mol % | — | — | — | — | — | — | — | 1.9 | — | 0.5 | — |
| $Sb_2O_3$ | mol % | — | — | — | — | 0.05 | — | — | — | — | — | — |
| $SnO_2$ | mol % | — | — | — | — | — | — | 0.2 | — | 0.15 | — | — |
| S | mol % | 0.6 | 0.5 | — | — | — | — | — | — | — | 0.1 | — |
| others | mol % | — | 0.018 ($Er_2O_3$) | — | — | — | — | — | — | — | — | — |
| $Fe^{3+}$ | ppm | 900 | 95 | 240 | 100 | 100 | 120 | 150 | 1000 | 300 | 300 | 130 |
| $Cr^{3+}$ | ppm | | 0.9 | | | | 5 | | | | | 4 |
| $Ni^{2+}$ | ppm | | 0.5 | | | | 2 | | | | | 3 |
| $Co^{2+}$ | ppm | | 0.65 | | | | 2 | | | | | 2 |
| $Cu^{2+}$ | ppm | | 1.75 | | | | 4 | | /// | | | 5 |
| $Mn^{2+}$ | ppm | | 3.7 | | | | 2 | | | | | 2 |
| $V^{5+}$ | ppm | | 1.2 | | | | 2 | | | | | 2 |
| Absorption power ppm | | | 426 | | | | 1204 | | | | | 1239 |
| σ | g cm$^{-3}$ | 2.5 | 2.51 | 2.28 | 2.55 | 2.51 | 2.23 | 2.43 | 2.77 | 2.39 | 2.48 | 2.225 |
| α | $10^{-6}$ K$^{-1}$ | 8.9 | 9.0 | 4.1 | 9.4 | 7.2 | 3.35 | 3.2 | 8.3 | 7.6 | 9.8 | 3.44 |
| $T_g$ | °C. | 520 | 515 | 585 | 533 | 557 | 516 | 717 | 569 | 630 | 604 | 518 |
| L4 | °C. | 1020 | 1022 | 1271 | 1033 | 1051 | 1252 | 1295 | 1145 | | | 1251 |
| $n_d$ | | 1.517 | | 1.479 | 1.5225 | 1.523 | 1.4738 | 1.51 | 1.55 | 1.5 | 1.51 | 1.48 |
| H | ISO 719 | HGB 3 | HGB 3 | HGB 1 | HGB 3 | HGB 1 | HGB 1 | HGB 1 | HGB 1 | | | HGB 1 |
| S | ISO 1776 | S 3 | S 3 | S 1 | S 2 | S 2 | S 1 | S 4 | S 3 | | | S 1 |
| L | ISO 695 | L A3 | L A3 | L A2 | L A2 | L A2 | L A2 | L A3 | L A1 | | | L A2 |
| Dielectric constant | | | | | | | | | | | | |
| | at 1 MHz | 7.6 | | | | | 4.7 | 5.1 | | | | 4.6 |
| Dissipation factor | | | | | | | | | | | | |
| at 5 GHz | 1 MHz | 0.0300 | | | | | 0.0039 | 0.0049 | | | | 0.0049 |

DETAILED DESCRIPTION

Figure 1:
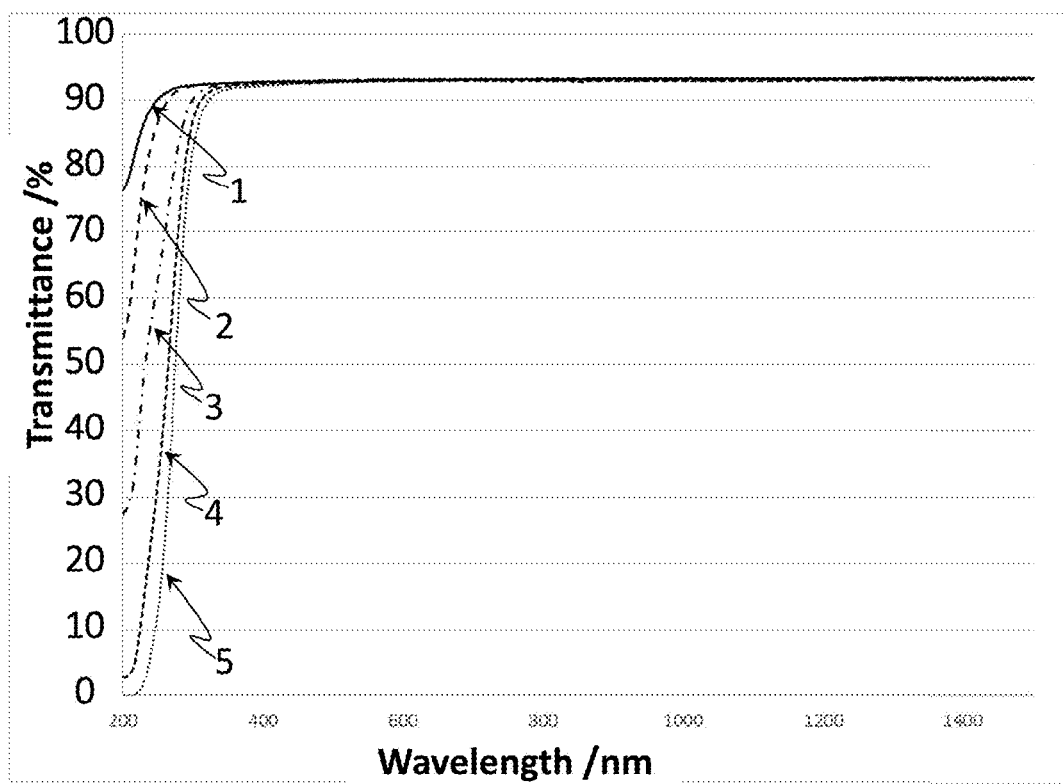
FIG. 1 shows curves of spectral transmittance for electromagnetic radiation in the wavelength range from 200 nm to 1500 nm for flat glass according to the invention.

FIG. 1 shows curves of spectral transmittance of different flat glasses for a thickness of 1 mm according to different embodiments.

Transmittance curve 1 was obtained for a flat glass with a composition corresponding to glass 5 from Table 1.

Transmittance curve 2 was obtained for a flat glass with a composition corresponding to glass 4 from Table 1.

Transmittance curve 3 was obtained for a flat glass with a composition corresponding to glass 8 from Table 1.

Transmittance curve 4 was obtained for a flat glass with a composition corresponding to glass 3 from Table 1.

Transmittance curve 5 was obtained for a flat glass with a composition corresponding to glass 2 from Table 1.

Figure 2:
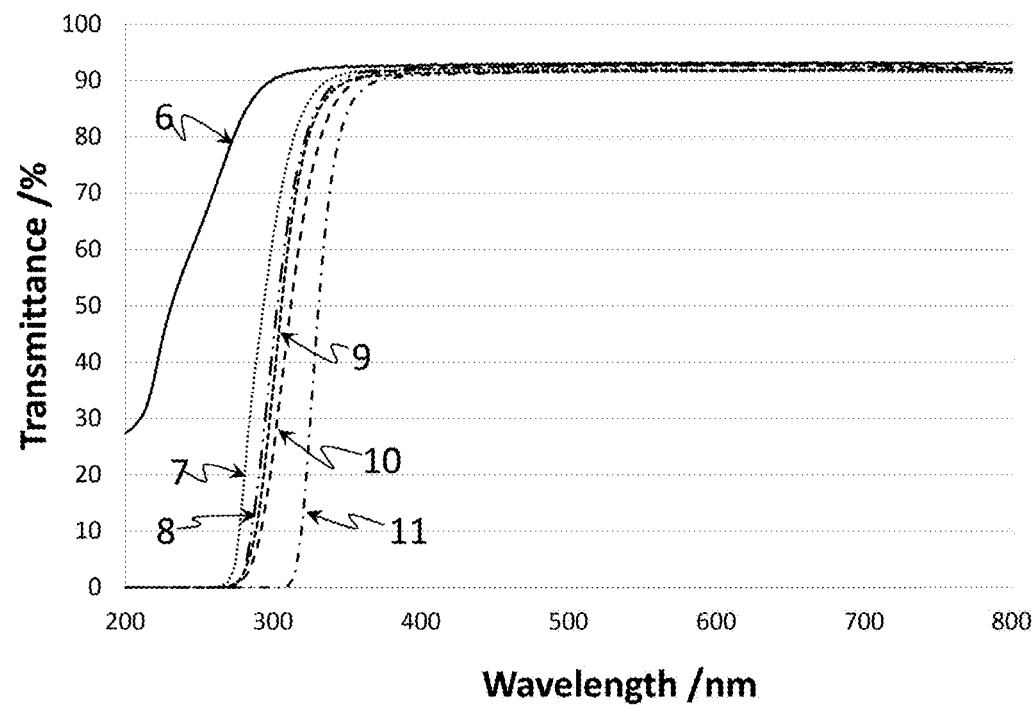
FIG. 2 shows a further transmittance spectrum in the wavelength range from 200 nm to 800 nm for the exemplary glass 8 in comparison with selected comparative glasses.

FIG. 2 shows a further transmittance spectrum of a flat glass for a thickness of 1 mm according to one embodiment in comparison to transmittance spectra that were obtained for selected comparative glasses, again for a thickness of 1 mm. Here, the wavelength range from 200 nm to 800 nm is considered.

Transmittance curve 6 was obtained for a flat glass with a composition corresponding to glass 8 from Table 1.

Transmittance curve 7 was obtained for a glass of 1 mm thickness with a composition corresponding to glass B from Table 2.

Transmittance curve 8 was obtained for a glass of 1 mm thickness with a composition corresponding to glass F from Table 2.

Transmittance curve 9 was obtained for a glass of 1 mm thickness with a composition corresponding to glass D from Table 2.

Transmittance curve 10 was obtained for a glass of 1 mm thickness with a composition corresponding to glass I from Table 2.

Transmittance curve 11 was obtained for a glass of 1 mm thickness with a composition corresponding to glass E from Table 2.

It can clearly be seen that the flat glass according to an embodiment of the invention exhibits increased transmittance within the entire illustrated wavelength range, in comparison to the prior art glasses.

Figure 3:
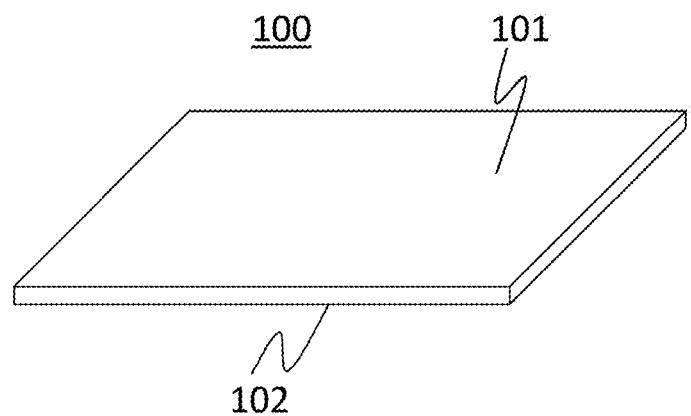
FIG. 3 is a schematic view of a flat glass, not drawn to scale.

FIG. 3 is a schematic view of a flat glass 100, not drawn to scale. Flat glass 100 comprises two surfaces 101 and 102. In the context of the present invention, the two principal surfaces of the glass body are referred to as the surfaces 101, 102 of the flat glass 100, i.e. those surfaces which are defined by the length and the width of the glass body.

The flat glass 100 exhibits transmittance for electromagnetic radiation, in particular in the wavelength range from 200 nm to 1500 nm, and at a thickness of the flat glass of 1 mm the flat glass exhibits a transmittance to electromagnetic radiation which is 20% or more, preferably 60% or more, more preferably 85% or more, and most preferably 88% or more at a wavelength of 254 nm; and/or which preferably is 82% or more, preferably 90% or more, more preferably 91% or more at a wavelength of 300 nm; and/or which preferably is 90% or more, preferably 91% or more at a wavelength of 350 nm; and/or which preferably is 92% or more, preferably 92.5% or more at a wavelength of 546 nm; and/or which preferably is 92.5% or more, preferably 93% or more at a wavelength of 1400 nm; and/or which is 91.5% or more, preferably 92% or more in a wavelength range from 380 nm to 780 nm; and/or which preferably is 92.5% or more, preferably 93% or more in a wavelength range from 780 nm to 1500 nm.

According to a preferred embodiment, the flat glass 100 comprises a content of oxides of network formers, in particular of oxides of silicon and/or boron, of not more than 98 mol % in total.

Preferably, the flat glass 100 has a coefficient of linear thermal expansion or between $2.4*10^{-6}/K$ and $3.5*10^{-6}/K$.

According to one embodiment, the flat glass 100 has a content of $SiO_2$ between 72 mol % and 85 mol %, preferably between 76 mol % and 85 mol %.

According to a further embodiment, the flat glass 100 comprises $B_2O_3$, wherein preferably the content of $B_2O_3$ in the flat glass is between 10 mol % and 25 mol %, most preferably between 10 mol % and 22 mol %.

The flat glass 100 preferably comprises $SiO_2$ and $B_2O_3$, wherein preferably $\Sigma(SiO_2+B_2O_3)$ is 92 mol % to 98 mol %.

According to another embodiment of the flat glass 100, $\Sigma R_2O$ is between 1 mol % and 5 mol %, wherein $R_2O$ stands for alkali metal oxides.

With regard to the ratio of molar amounts of the components of the flat glass 100, preferably the following applies:

| | |
|---|---|
| $B_2O_3/SiO_2$ | 0.12 to 0.35; and/or |
| $\Sigma(Me_xO_y)/(\Sigma(SiO_2 + B_2O_3))$ | 0.02 to 0.10; | wherein Me represents a metal which usually has the oxidation number y in oxides, in particular one of an alkali metal and/or alkaline earth metal, and aluminum.

According to yet another embodiment of the flat glass 100, the following applies to the ratio of weight fractions of the iron ions contained in the flat glass:

$$\leq Fe^{2+}/(Fe^{2+}+Fe^{3+}) \leq 0.3.$$

In accordance with yet another embodiment of the flat glass 100, the following applies to the metals Fe, Co, Ni, Cr, Cu, Mn, V contained in the flat glass 100 with regard to the weight fractions thereof, in ppm:

$$\Sigma(1*Fe+300*Co+70*Ni+50*Cr+20*Cu+5*Mn+2*V)$$
[ppm by mass]

is less than 200 ppm, preferably less than 150 ppm, more preferably less than 100 ppm, yet more preferably less than 50 ppm, and most preferably less than 25 ppm;

wherein the total content of the considered metals in the flat glass 100 is considered irrespective of their oxidation state.

Preferably, the transformation temperature $T_g$ of the flat glass 100 is between 450° C. and 550° C.

According to one embodiment of the flat glass 100, it has a viscosity η, and lg η has a value of 4 at temperatures between 1000° C. and 1320° C.

According to yet another embodiment of the flat glass 100, the refractive index $n_d$ of the flat glass 100 at a light wavelength of 587.6 nm is less than 1.475.

The flat glass 100 is preferably distinguished by values of chemical resistance against water according to DIN ISO 719 class HGB 1;
against acids according to DIN 12116 class S 1 W; and
against alkalis according to DIN ISO 695 class A3 or better.

According to another embodiment, the flat glass 100 comprises the following constituents:

| | |
|---|---|
| $SiO_2$ | 72 mol % to 85 mol %, preferably 76 mol % to 85 mol %, |
| $B_2O_3$ | 10 mol % to 25 mol %, preferably 10 mol % to 22 mol %, |
| $Al_2O_3$ | 0.2 mol % to 2.5 mol %, |
| $Na_2O$ | 0.5 mol % to 5.0 mol %, |
| $K_2O$ | 0 mol % to 1.0 mol %, |
| $Li_2O$ | 0 mol % to 1.5 mol %, | wherein, preferably, the alkali metal oxides $Na_2O$, $K_2O$, $Li_2O$ contained in the flat glass 100, preferably all alkali metal oxides contained in the flat glass 100, amount to less than 5 mol % in total.

According to one embodiment, the flat glass 100 is produced or producible by a melting process with subsequent hot forming, in particular in a float process, a rolling process, or a drawing process such as a down-draw process, preferably an overflow fusion down-draw process, or an up-draw process, or a Foucault process.

What is claimed is:

1. A flat glass comprising a transmittance to electromagnetic radiation for glass having a thickness of 1 mm that is 20% or more at a wavelength of 254 nm, 82% or more at a wavelength of 300 nm, 90% or more at a wavelength of 350 nm, 92% or more at a wavelength of 546 nm, 92.5% or more at a wavelength of 1400 nm, 91.5% or more in a wavelength range from 380 nm to 780 nm, and 92.5% or more in a wavelength range from 780 nm to 1500 nm, wherein the flat glass comprises $B_2O_3$, and wherein the flat glass further comprises a ratio of weight fractions of ions of iron that is $0.1 \leq Fe^{2+}/(Fe^{2+}+Fe^{3+}) \leq 0.3$ and comprises a ratio of molar amounts $\Sigma(Me_xO_y)/(\Sigma(SiO_2+B_2O_3))$ between 0.02 to 0.10, wherein Me is selected from a group consisting of an alkali metal, an alkaline earth metal, and aluminum.

2. The flat glass of claim 1, wherein the transmittance is 60% or more at the wavelength of 254 nm, 90% or more at the wavelength of 300 nm, 91% or more at the wavelength of 350 nm, 92.5% or more at the wavelength of 546 nm, 93% or more at the wavelength of 1400 nm, 92% or more in the wavelength range from 380 nm to 780 nm, and 93% or more in the wavelength range from 780 nm to 1500 nm.

3. The flat glass of claim 2, wherein the transmittance is 85% or more at a wavelength of 254 nm and 91% or more at a wavelength of 300 nm.

4. The flat glass of claim 3, wherein the transmittance is 88% or more at a wavelength of 254 nm.

5. The flat glass of claim 1, further comprising a content of oxides of network formers of not more than 98 mol % in total.

6. The flat glass of claim 5, wherein the oxides of network formers comprise oxides of silicon and/or boron.

7. The flat glass of claim 1, further comprising a coefficient of linear thermal expansion between $2.4*10^{-6}$/K and $3.5*10^{-6}$/K.

8. The flat glass of claim 1, further comprising a content of $SiO_2$ between 72 mol % and 85 mol %.

9. The flat glass of claim 1, further comprising a content of $B_2O_3$ between 10 mol % and 25 mol %.

10. The flat glass of claim 1, further comprising $\Sigma(SiO_2+B_2O_3)$ of 92 mol % to 98 mol %.

11. The flat glass of claim 1, further comprising $\Sigma R_2O$ that is between 1 mol % and 5 mol %, wherein $R_2O$ is alkali metal oxides.

12. The flat glass of claim 1, further comprising a ratio of molar amounts of $B_2O_3/SiO_2$ between 0.12 to 0.35.

13. The flat glass of claim 1, wherein for the weight fractions, in ppm, of Fe, Co, Ni, Cr, Cu, Mn, and V, the following applies: $\Sigma(1*Fe+300*Co+70*Ni+50*Cr+20*Cu+5*Mn+2*V)$ [ppm by mass] is less than 200 ppm, wherein a total content of considered metals is considered irrespective of an oxidation state thereof.

14. The flat glass of claim 1, further comprising a transformation temperature between 450° C. and 550° C.

15. The flat glass of claim 1, further comprising having a viscosity $\eta$, wherein lg $\eta$ has a value of 4 at temperatures between 1000° C. and 1320° C.

16. The flat glass of claim 1, further comprising a refractive index at a light wavelength of 587.6 nm that is less than 1.475.

17. The flat glass of claim 1, further comprising a value of chemical resistance against water according to DIN ISO 719 class HGB 1, a value of chemical resistance against acids according to DIN 12116 class S 1 W; and a value of chemical resistance against alkalis according to DIN ISO 695 class A3 or better.

18. The flat glass of claim 1, comprising:

| | |
|---|---|
| $SiO_2$ | 72 mol % to 85 mol %, |
| $B_2O_3$ | 10 mol % to 25 mol %, |
| $Al_2O_3$ | 0.2 mol % to 2.5 mol %, |
| $Na_2O$ | 0.5 mol % to 5.0 mol %, |
| $K_2O$ | 0 mol % to 1.0 mol %, and |
| $Li_2O$ | 0 mol % to 1.5 mol %. |

19. The flat glass of claim 18, wherein the $Na_2O$, $K_2O$, $Li_2O$ amount to less than 5 mol % in total.

* * * * *